United States Patent [19]
Barth

[11] 3,803,801
[45] Apr. 16, 1974

[54] INSECT CONTROL DEVICE

[76] Inventor: Warren W. Barth, 145 S. Ninth St., Lincoln, Nebr.

[22] Filed: Oct. 16, 1972

[21] Appl. No.: 297,668

[52] U.S. Cl. .................................................. 54/81
[51] Int. Cl. ............................................... B68c 5/00
[58] Field of Search .......... 54/81, 24; 119/106, 156, 119/160

[56] References Cited
UNITED STATES PATENTS

| | | | |
|---|---|---|---|
| 1,498,397 | 6/1924 | Moyer | 54/24 |
| 481,152 | 8/1892 | Steele | 54/81 |
| 2,219,569 | 10/1940 | Vanderhoof | 119/156 |
| 3,213,830 | 10/1965 | Wibemann | 119/106 |

Primary Examiner—Louis G. Mancene
Assistant Examiner—J. Q. Lever
Attorney, Agent, or Firm—Fishburn, Gold & Litman

[57] ABSTRACT

An insect control device for use on the head portion of animals, such as cattle, horses, and the like for protecting eyes, face, head, and neck portion thereof from insects, face flies, and the like includes a halter like structure of straps or bands having insecticide impregnated therein. The device includes a head strap which extends around a forehead portion of an animal and has opposite end portions thereof adjustably connected to a band adjacent respective sides of the head of the animal. The band is adjustable and extends around a neck portion of the animal and behind the ears thereof and has opposite end portions of a nose strap adjustably connected thereto at respective positions adjacent respective sides of the head of the animal with the nose strap extending over a nose portion of the head of the animal. A plurality of lash strips are positioned over the eyes of the animal and mounted on the head strap.

4 Claims, 5 Drawing Figures

PATENTED APR 16 1974

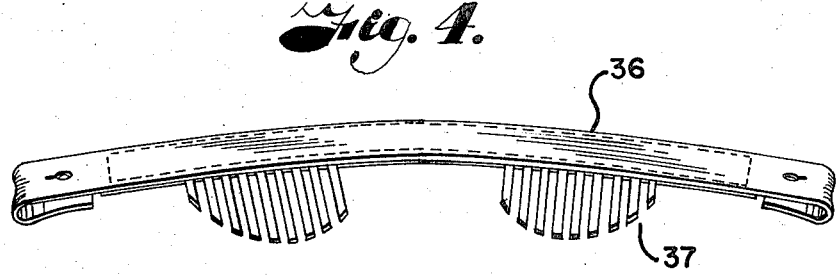
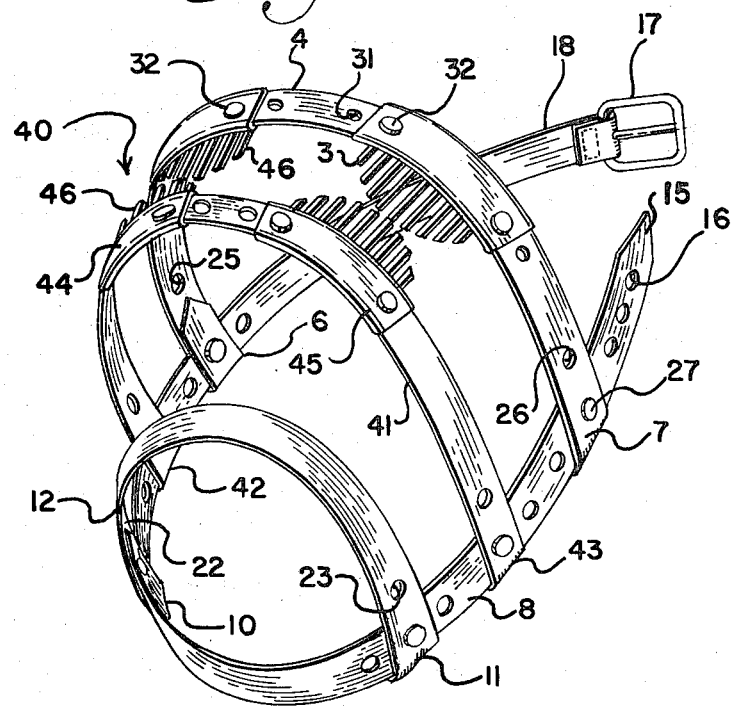

INSECT CONTROL DEVICE

The present invention relates to insect control devices and more particularly to an insect control device for use on a head portion of animals for protecting the eyes, face, head, and neck portion from insects.

The principal objects of the present invention are to provide an insect control device for protecting the eyes, face, head, and neck portion of large animals, such as cattle, horses, and the like, from insects including flies, face flies, head lice, mosquitos, and the like; to provide such an insect control device adapted to be applied to an animal in Spring when the animal is turned out to pasture; to provide such an insect control device having slowly emitted insecticide and repellent adapted to last three to four months without creating a disturbing reaction to the animal; to provide such an insect control device having good animal acceptance; to provide such an insect control device formed of soft pliable plastic material containing or impregnated with an effective slowly emitted insecticide and repellents preferably having a season life of residual activity; to provide such an insect control device having a plurality of lash strips reinformed to maintain same out of engagement with eyes of the animal; to provide such an insect control device having coded identification means representing the particular animal, type of repellent and insecticide and other information as desired; and to provide such an insect control device which is economical to manufacture, durable in construction, adjustable to conform to the respective animal, easy to install on the animal, and particularly well adapted for the proposed use.

Other objects and advantages of this invention will become apparent from the following description taken in connection with accompanying drawings wherein are set forth by way of illustration and example, certain embodiments of this invention.

The drawings constitute a part of this specification and include exemplary embodiments of the present invention and illustrate various objects and features of the insect control device.

FIG. 4 is a perspective view of a modified head strap having lash strips mounted thereon and shown at the same scale as FIG. 3.

FIG. 5 is a perspective view of a modified insect control device having a second head strap with a plurality of lash strips mounted thereon.

Figure 1:
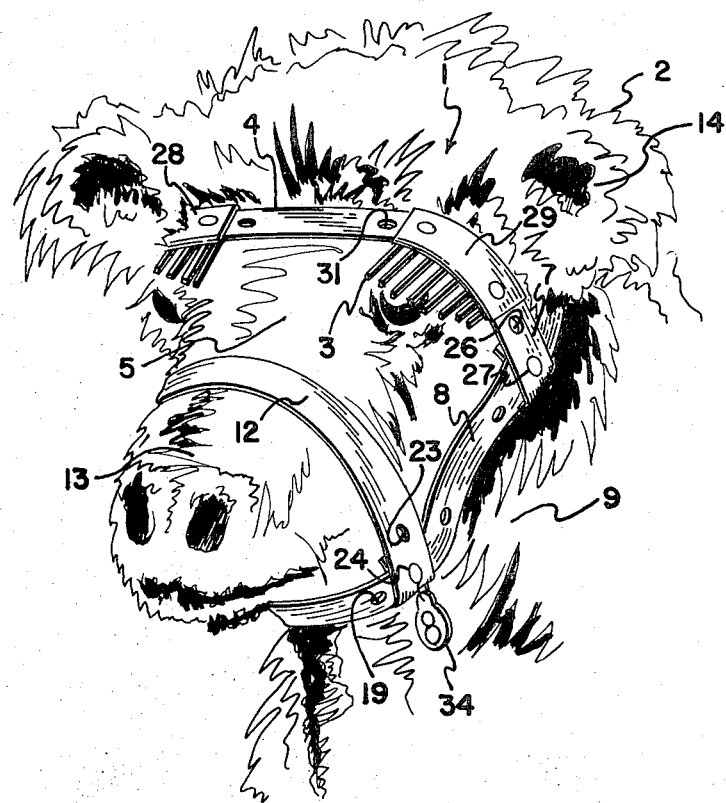
FIG. 1 is a perspective view of an insect control device embodying features of the present invention and shown on a head portion of an animal.
Figure 2:
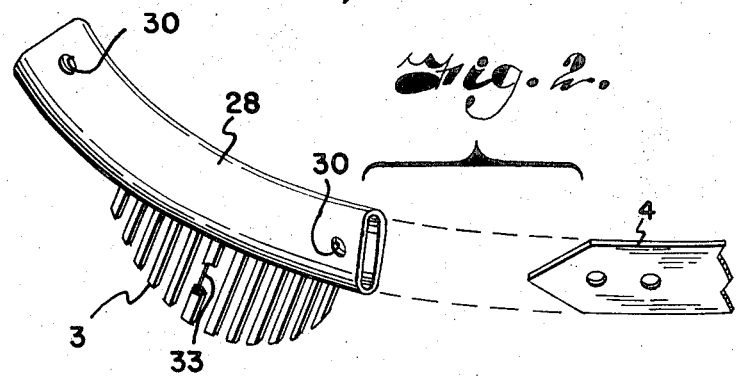
FIG. 2 is an enlarged exploded perspective view of a sleeve member having lash strips mounted thereon.
Figure 3:
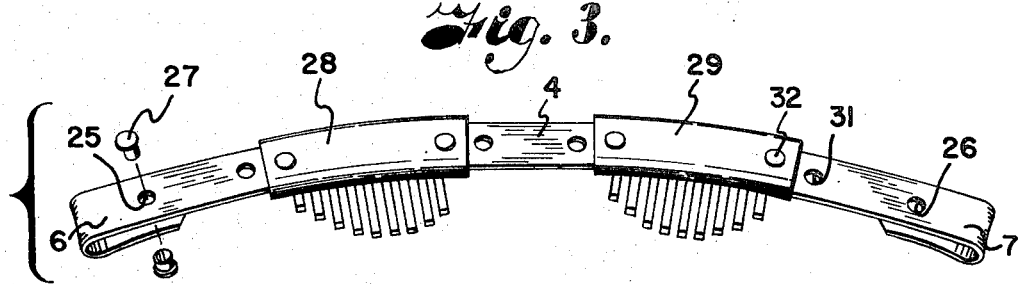
FIG. 3 is a perspective view of a head strap having a pair of the sleeve member thereon and shown at a scale smaller than FIG. 2.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates an insect control device for use on a head portion 2 of animals, such as cattle, horses, and the like for protecting the eyes, face, head, and neck portion thereof from insects. The illustrated insect control device 1 includes a head strap 4 which extends over a forehead portion 5 of a head 2 of an animal and has opposite end portions 6 and 7 thereof adjustably connected to a band 8 adjacent respective sides of the head 2 of the animal. The band 8 is adjustable and extends around a neck portion 9 of the animal and behind the ears thereof and has opposite end portions 10 and 11 of a nose strap 12 adjustably connected thereto and at respective positions adjacent respective sides of the head 2 of the animal with the nose strap 12 extending over a nose portion 13 of the head 2 of the animal. A plurality of lash strips 3 are positioned over the eyes of the animal and are mounted on the head strap 4.

The control device may be a plurality of straps or bands in the form of a halter. In the illustrated structure the band 8 is an elongated member adapted to be placed around the neckportion 9 of an animal and behind the ears 14 thereof. The band 8 is preferably adjustable to conform to the neck portion 9 of the animal and in the illustrated device, one end portion 15 has a plurality of longitudinally spaced apertures 16 therein adapted to receive a suitable buckle 17 mounted on the other end portion 18 of the band 8. The band 8 also has a plurality of apertures 19 at selected locations along portions thereof and adjacent the sides of the head portion 2 of the animal, for a purpose later described.

The band 8 preferably is formed of a soft, pliable material impregnated with or containing a suitable insecticide particularly effective in controlling flies, face flies, head lice, mosquitos, and other bothersome insects and preferably an insecticide with season length residual activity and which is slowly emitted.

The illustrated nose strap 12 is an elongated member extending over the nose portion 13 of the head portion 2 of the animal and having the opposite end portions 10 and 11 thereof adjustably connected to the band 8 at respective sides of the head portion 2 of the animal. In the illustrated device, the opposite end portions 10 and 11 have a plurality of spaced apertures 22 and 23 therein respectively. The opposite end portions 10 and 11 are adapted to extend or loop around respective portions of the band 8 and have the apertures 22 and 23 therein aligned with selected apertures 19 in the band 8 and to receive suitable fastening device 24 therein for connecting the nose strap 12 to the band 8.

The nose strap 12 is also preferably formed of a suitable soft, pliable material impregnated with or containing an effective insecticide similar or equal to the insecticide of the band 8 for protecting the nose portion 13 and adjacent portions of the face and head portion 2 of the animal.

The illustrated head strap 4 is an elongated member extending over a forehead portion 5 of the head portion 2 of the animal and having the opposite end portions 6 and 7 thereof each adjustably connected to the band 8 at respective sides of the head portion 2 of the animal. The illustrated head strap 4 has a plurality of apertures 25 and 26 in the end portions 6 and 7 respectively. The end portions 6 and 7 of the head strap 4 are each adapted to extend around respective portions of the band 8 and to have the apertures 25 and 26 respectively therein aligned with respective apertures 19 in the band 8 for receiving a suitable fastening device 27 therein for removably connecting the head strap 4 to the band 8.

The head strap 4 is also preferably formed of a soft, pliable material impregnated with or containing an effective insecticide to protect the forehead portion 5 of the face of the head portion 2 of the animal. The head strap 4, nose strap 12 and band 8 may be of suitable pliable plastic impregnated or containing the insecticide.

The position of the lash strips 3 is preferably adjustable along the head strap 4 so that the lash strips 3 are positioned to extend at least partially over the eyes of the animal. An example of a structure is a pair of sleeve portions 28 and 29 are mounted on the head strap 4 and movable therealong to locate each over a respective eye. The sleeve portions 28 and 29 each have a plurality of the strips 3 mounted thereon. The sleeve portions 28 and 29 each have a pair of apertures 30 therein and positioned adjacent respective opposite ends of the sleeve portions 28 and 29. The apertures 30 are each alignable with a respective one of a plurality of spaced apertures 31 in the head strap 4 for connecting the sleeve portions 28 and 29 to the head strap 4, as by means of a suitable fastening devices 32.

The sleeve portions 28 and 29 are also soft, pliable plastic material and are removable and replaceable. The sleeve portions 28 and 29 preferably have a wear-off type insecticide coated thereon to permit new or fresh insecticide to be present continuously during wear by the animal.

The lash strips 3 are narrow strips mounted on the head strap 4 and positioned to extend at least partially over the eyes of the animal and guard same from insects. The illustrated lash strips or guards 3 are mounted on the sleeve portions 28 and 29 and it is desirable that the guards or lash strips 3 be substantially rigid members and be maintained in spaced relation above and out of contact with the eyes of the animal, therefore, each of the lash strips 3 has a reinforcing member 33 therein. It is also desirable that the guards or lash strips 3 contain or be coated with a suitable insecticide having a slowly emitted or slow wear-off type surface to permit new or fresh insecticide to be present continuously. Suitable aerosol or spray activators may also be applied to the guards or lash strips periodically to provide longer lasting effectiveness of the insert control device.

It is desirable to provide coded identification means on the insect control device 1 for identifying the respective animal, type of insecticide employed, and other information as desired. In the illustrated structure, a tag 34 is connected to the band 8 in one of the apertures 19 therein. The tag 34 may be any suitable material, such as nylon, metal, or the like, and the tag 34 may be color coded to identify the respective insecticide or repellent employed in the insect control device 1. The lash strips 3 and the sleeve portions 28 and 29 may also be color coded to identify the respective insecticide used.

In using an insect control device, as illustrated and described, the band 8 is positioned around the neck portion 9 of the animal with the end portions 15 and 18 thereof connected together by means of the buckle 17. The nose strap 12 is positioned over the nose portion 13 of the head portion 2 and the opposite end portions 10 and 11 are connected to the band 8 by the fastening devices 24 extending through the apertures 22 and 23 in their respective end portions 10 and 11 and through the selected apertures 19 in the band 8. The head strap 4 having the sleeve portions 28 and 29 thereon is positioned over the forehead portion 5 and above the eyes of the animal with the opposite end portions 6 and 7 thereof being connected to the band 8 by the fastening devices 27 in a manner similar to connecting the nose strap 12 to the band 8. The sleeve portions 28 and 29 are moved along the head strap 4 to the desired position having the lash strips 3 extending at least partially over the eyes of the animal and secured to the head strap 4 by means of the fastening devices 32. The insect control device 1 is preferably mounted or attached to the animal during the Spring prior to turning or letting the animal out to pasture and the identification tag 34 having a number thereon and of a selected color as desired is secured to the band 8 for identifying the respective animal and the type of insecticide and repellent employed in the insect control device 1.

FIG. 4 illustrates a modified head strap 36 having a plurality of lash strips 37 mounted thereon with the head strap 36 being removably connected to the band 8 in a manner similar to the connecting of the head strap 4 thereto whereby the modified head strap 36 is removable from the insect control device and adaptable to receive an aerosol or spray activator or to be replaced by another head strap to maintain the effectiveness of protection of the eyes and head of the animal.

FIG. 5 illustrates a modified insect control device 40 having a second head strap 41 spaced from the head strap 4 and having opposite end portions 42 and 43 each adjustably connected to the band 8 at a respective side of the head portion 2 of the animal. The second head strap 41 is positioned below the eyes of the animal.

A second pair of sleeve portions 44 and 45 are mounted on the second head strap 41 and movable therealong and the second sleeve portions 44 and 45 each have a plurality of spaced lash strips 46 thereon. The lash strips 46 are positioned to extend toward the lash strips 3 mounted on the sleeve portions 28 and 29 thereby providing maximum protection for the eyes of the animal.

It is to be understood that while I have illustrated and described certain forms of my invention, it is not to be limited to these specific forms or arrangements of parts herein described and shown.

What I claim and desire to secure by Letters Patent is:

1. An insect control device for animals and comprising:
   a. a band adapted to be placed around a neck portion of an animal;
   b. a nose strap secured to said band and adapted to extend at least partially around a nose portion of the head of the animal;
   c. a head strap connected to said band and adapted to extend at least partially around the head of the animal and adjacent the eyes thereof;
   d. a plurality of laterally spaced narrow substantially rigid strips mounted at one end thereof on said head strap and positioned to extend at least partially over the eyes of the animal;

e. said band and nose strap and head strap are each adjustable to conform to the respective portions of the head of the animal; and f. said narrow strips include a pair of sleeve portions each having a plurality of spaced strips mounted thereon and movable along said head strap and having means for connecting said sleeve portions to said head strap.

2. An insect control device for animals and comprising:

a. a band adapted to be placed around a neck portion of an animal;

b. a nose strap secured to said band and adapted to extend at least partially around a nose portion of the head of the animal;

c. a head strap connected to said band and adapted to extend at least partially around the head of the animal and adjacent the eyes thereof;

d. a plurality of laterally spaced narrow substantially rigid strips mounted at one end thereof on said head strap and positioned to extend at least partially over the eyes of the animal;

e. said head strap is positioned on the forehead of the animal and above the eyes thereof;

f. a second head strap is connected to said band and spaced from said first named head strap and adapted to extend at least partially around the head of the animal and below the eyes thereof;

g. said second head strap has one end of each of a plurality of laterally spaced narrow substantially rigid strips mounted thereon and positioned to extend toward said respective first named narrow strips;

h. said first named narrow strips mounted on said first named head strap and said second named narrow strips mounted on said second head strap include a plurality of sleeve portions arranged in pairs on each of said first named head strap and said second head strap;

i. said sleeve portions each have a plurality of spaced strips mounted thereon;

j. said sleeve portions are each movable along said respective head straps; and k. said sleeve portions each have means for connecting same to said respective head straps.

3. An insect control device for animals and comprising:

a. a band adapted to be placed around the neck of an animal and behind the ears thereof, said band being adjustable to conform to the neck of the animal;

b. an elongated nose strap extending over a nose portion of the head of the animal and having opposite end portions each adjustably connected to said band at a respective side of the head of the animal;

c. an elongated head strap extending over a forehead portion of the head of the animal and having opposite end portions each adjustably connected to said band at a respective side of the head of the animal;

d. a plurality of laterally spaced narrow substantially rigid strips mounted at one end thereof on said head strap and positioned to extend at least partially over the eyes of the animal;

e. coded identification means connected to said band for identifying the animal;

f. a second elongated head strap spaced from said first named head strap and having opposite end portions thereof each adjustably connected to said band at a respective side of the head of the animal, said second head strap being positioned below the eyes of the animal;

g. a plurality of laterally spaced narrow substantially rigid strips mounted at one end thereof on said second strap and positioned to extend toward said respective first named narrow strips mounted on said first named head strap;

h. said first named narrow strips mounted on said first named head strap and said second named narrow strips mounted on said second head strap include a plurality of sleeve portions arranged in pairs on each of said first named head strap and said second head strap;

i. said sleeve portions each have a plurality of spaced strips thereon;

j. said sleeve portions are each movable along said respective head straps; and k. said sleeve portions each have means for connecting same to said respective head straps.

4. An insect control device as set forth in claim 3 wherein:

a. said band, nose strap, first named head strap, and second head strap are each formed of pliable material impregnated with an insecticide;

b. said sleeve portions and the plurality of strips thereon are each formed of pliable material coated with an insecticide; and c. said plurality of strips each have a reinforcing member therein.

* * * * *